Figure 1:
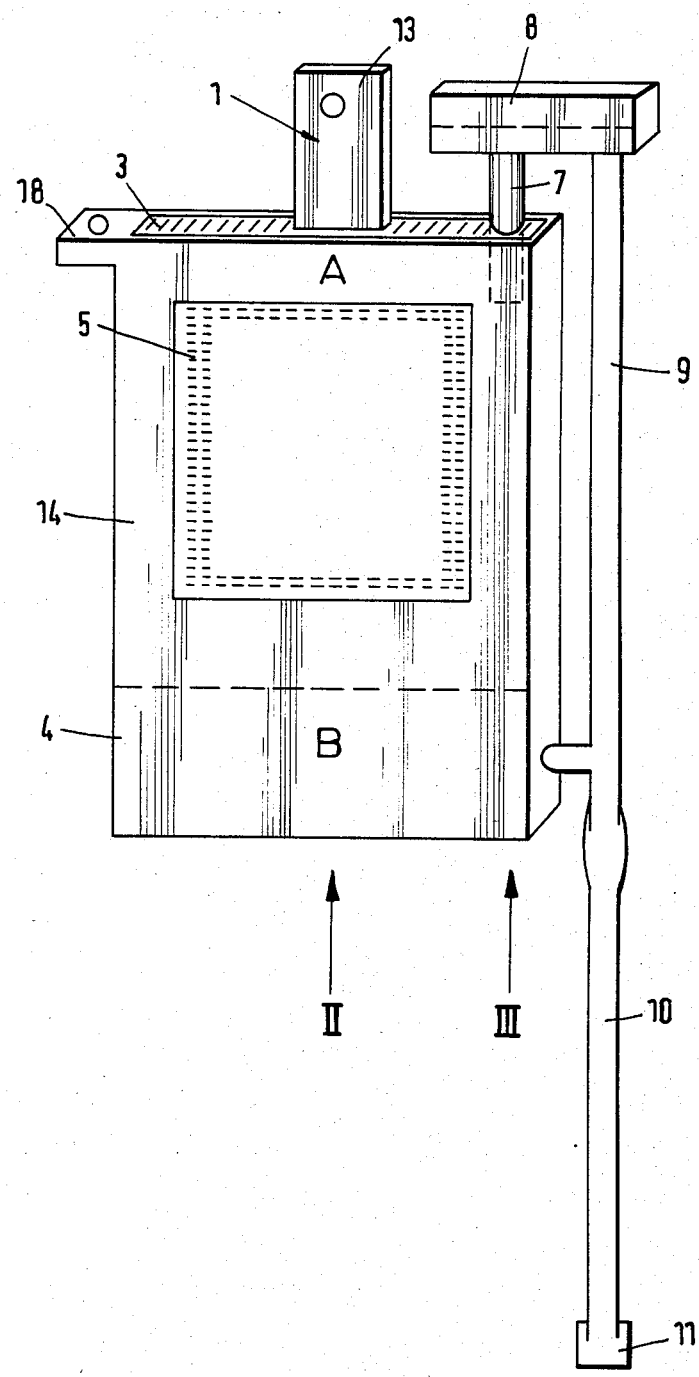

United States Patent [19]

Ruch et al.

[11] Patent Number: 4,507,367
[45] Date of Patent: Mar. 26, 1985

[54] GALVANIC ELEMENT, PARTICULARLY A METAL-AIR CELL

[75] Inventors: Jean Ruch; Detlef Katryniok; Hugo Pack, all of Brilon, Fed. Rep. of Germany

[73] Assignee: Accumulatorenwerke Hoppecke Carl Zoellner & Sohn GmbH & Co. KG, Brilon, Fed. Rep. of Germany

[21] Appl. No.: 399,058

[22] Filed: Jul. 16, 1982

[30] Foreign Application Priority Data

Jul. 24, 1981 [DE] Fed. Rep. of Germany ....... 3129248

[51] Int. Cl.³ .............................................. H01M 4/00
[52] U.S. Cl. ....................................... 429/27; 429/34; 429/72; 429/81; 429/82
[58] Field of Search ..................... 429/27–29, 429/14, 51, 34, 72, 80–82

[56] References Cited

U.S. PATENT DOCUMENTS 3,092,516  6/1963  Rightmire ............................. 429/34
4,035,554  7/1977  Halberstadt ........................... 429/80
4,139,679  2/1979  Appleby et al. .................. 429/27 X
4,181,776  1/1980  Lindstrom ............................. 429/27
4,296,184  10/1981  Stachurski ....................... 429/27 X Primary Examiner—Charles F. LeFevour
Attorney, Agent, or Firm—Martin A. Farber

[57] ABSTRACT

A galvanic element, particularly a metal-air cell, comprising a consumable metal electrode of flat shape which extends into a container containing the electrolyte, a gas-diffusion electrode which can be freely flushed by gas and particularly air from the outside, being arranged at a distance from the working surface of said electrode. In order to improve the electrolyte circulation in such a system and thus promote the electrochemical conversion, the hydrogen produced upon the electrochemical conversion is collected within the container which contains the electrolyte and the pressure which builds up is utilized for the transport of the electrolyte. For this purpose, a gas-collection space is provided in the electrolyte container so that the gas pressure can act on the electrolyte and a pipe system is present through which the electrolyte which has been displaced is conducted out of the upper region of the container into the lower region of the container.

12 Claims, 3 Drawing Figures

GALVANIC ELEMENT, PARTICULARLY A METAL-AIR CELL

This invention concerns a galvanic element, particularly a metal-air cell, having a consumable metal electrode of flat shape which extends into a container containing the electrolyte, and a gas diffusion electrode, which can be freely flushed by the gas, and which is arranged at a distance from the working surface of the metal electrode.

A metal-air cell which operates with seawater as electrolyte and whose metal electrode is of flat shape and extends into a container containing the electrolyte is already known. Two gas-diffusion electrodes are arranged spaced from the flat sides of the metal electrode, which sides constitute its working surfaces, in such a manner that they can be freely flushed by the surrounding air. This known metal-air cell has the disadvantage that the system is limited with respect to its power output. In particular, the electrolyte circulation is insufficient and the electrodes flood due to connection.

In view of this prior art, the object of the present invention is to improve a galvanic element, particularly a metal-air cell of the afore-mentioned type, in such a way that higher power outputs are obtained. This is done by increasing mass transport within the galvanic element, but without using pumps or similar auxiliary units which are apart from the system.

This object is achieved in accordance with the invention by collecting the hydrogen which is produced upon the electrochemical conversion within the container which contains the electrolyte and using the pressure which builds up for transporting the electrolyte. In this manner, due to the formation of the hydrogen, there is provided a means for effecting the mass transport which actively supports the manner of operation of the electrolyte circulation, mass transport is otherwise based solely on convection, promoting it so that surprisingly larger power output can be obtained without the use of means foreign to the system.

A hermetically sealed collection space for the gas produced during the electrochemical conversion, particularly the hydrogen, is formed in the upper part of the container, to which there is connected a pipe system, acted on as a function of the gas pressure, for the transport of the electrolyte liquid from the upper region of the container into the lower region thereof. The action is that the cushion of gas produced in the collection space, upon reaching a given pressure, "pumps" the electrolyte through the pipe system from the upper region of the container into the lower region thereof, whereby the convective circulation is assisted by thermal force.

In order to improve the resultant pumping effect and avoid the formation of bubbles or other disturbing factors, it is proposed, in accordance with one suitable embodiment of the invention, that the container be hermetically closed by a cover which holds the metal electrode at its center and through which a discharge pipe connection is led into the container, the interior length of the connection defining the gas collection space and the discharge pipe connection carrying on the outside, or integrated with the container, an overflow vessel from which a return pipe leads into the lower region of the container. The overflow vessel is preferably vented by a hydrophobic closure.

For various uses it is of interest to keep the cell initially unactivated and to activate it by filling it with electrolyte liquid only when it is needed. For this purpose, in accordance with one advantageous improvement of the invention, a flexible siphon hose for the electrolyte liquid having a venting and electrolyte outlet closure adapted to be opened and closed, is connected to the return pipe. By lifting the siphon hose, the electrolyte liquid is introduced via the system of pipes into the container up to the level necessary for the activation and the cell is thus started. Due to the liberation of hydrogen, pressure then builds up in the gas-collection space and effects the circulation of the electrolyte through the system of pipes. In order to shut off the cell it is necessary in this embodiment to again bring the siphon hose back into its original low position, as a result of which the cell is emptied into the siphon hose and deactivated.

One particularly advantageous embodiment of the container involves producing it from an electrolyte-resistant metal, particularly nickel or alloy steel for alkaline electrolytes, which is provided with a current contact at any desired point, the second contact being formed as a lug on the metal electrode. In this case the container is provided with window-like cutouts in the flat surfaces thereof opposite the working surfaces of the metal electrode, into which cutouts a gas-diffusion electrode provided with a hydrophobic barrier layer is inserted. The connection of the gas-diffusion electrode to the container can be effected by soldering, conductive metal bonding, or a pulse technique. In addition to the particularly economical method of manufacture made possible by this suitable embodiment method of the metal-air cell, an advantage is that the two gas-diffusion electrodes are connected in parallel by the housing and the tapping off of the current can be effected without a contact frame or similar auxiliary elements in a manner easily adapted to the specific field of use of the cell.

The metal electrode may be rectangular and comprised, at least in part, of aluminum, namely in the region of its working surfaces. On the other hand, it is advisable to provide corrosion protection at the transition to the lug, particularly in the form of a plastic coating. It is also possible in this connection to construct the metal electrode as a combination of a metal which does not react (gas formation) with the specific electrolyte and is combined in the active region of the electrode with a metal which reacts with the formation of gas, so that danger of corrosion at the container output or the region of the lug is avoided.

The metal electrode can be surrounded by a plastic netting in order to prevent the detachment of particles, the netting possibly being formed at the same time as separator in order to avoid short circuits.

As a whole, effective electrolyte circulation is obtained by the invention without outside support devices such as pumps and thus the output of the cell is considerably increased. The cell can be activated in simple fashion and can be disconnected and reactivated at any time; it can be mechanically recharged and optimized in a structurally simple manner with regard to its heat economy via the housing. It is also suitable for use as an electrochemical energy reserve tank, for instance for the charging of secondary batteries or as emergency current unit.

Figure 2:
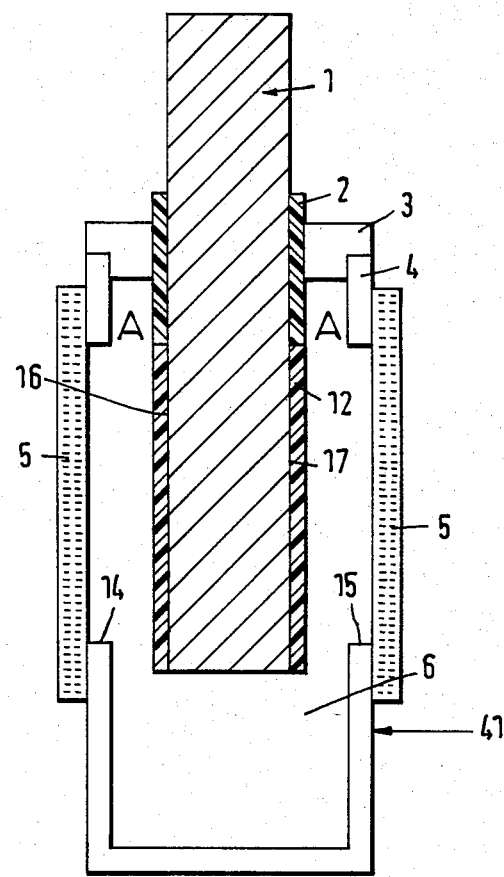
Figure 3:
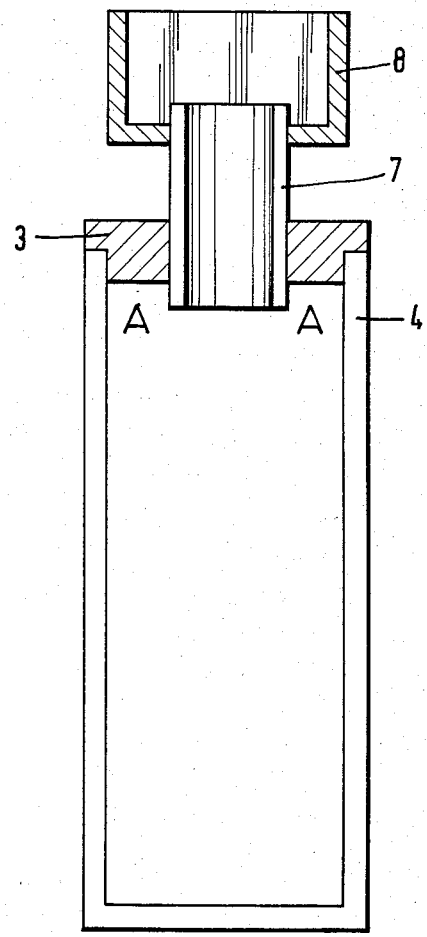

With the above and other objects and advantages in view, the present invention will become more clearly understood in connection with the detailed description of a preferred embodiment, when considered with the accompanying drawings, of which:

FIG. 1 is a perspective view of an aluminum-air cell;
FIG. 2 is a section along the arrow II in FIG. 1, and
FIG. 3 is a section along the arrow III in FIG. 1.

The aluminum-air cell shown comprises an anode 1 which constitutes a consumable aluminum electrode of flat rectangular shape, a container 4 made of nickel which receives therein an alkaline electrolyte, in particular KOH, and, as air electrodes, two gas-diffusion electrodes 5 arranged opposite each other on the flat sides of the container 4. The container 4 is, in principle, a rectangular box, the upper opening of which is sealed tightly closed by an electrically insulated cover 3. The cover 3 holds the anode 1 in its center, a lug 13 being integrally developed on the anode 1 as current tap and having a hole for the connection of a cable. The cover 3 furthermore has, in gas-tight and electrolyte-tight manner, a connection for a pipeline system described further below.

The facing wide or flat sides of the container 4 have window-like cutouts (openings) 14, 15 which are covered overlappingly on the outside by the gas-diffusion electrodes 5, as can be noted in particular from FIG. 2 of the drawing. The gas-diffusion electrodes 5 are hermetically connected to the container 4 by conductive metal bonding and, in the embodiment shown, constitute air electrodes with a hydrophobic barrier layer of polytetrafluorethylene applied in the form of a membrane foil so that they are gas-pervious on one side from the outside to the inside and liquid-tight on the other side from the inside to the outside.

The gas-diffusion electrodes 5 are arranged at a distance spaced from and directly opposite the two active surfaces 16, 17 of the anode 1 for promoting the electrochemical conversion. Above the gas-diffusion electrodes 5 there is a gas-collection space A in the upper part of the container 4, in which space the hydrogen which is produced during the electrochemical conversion can collect.

The afore-mentioned pipe system which is connected on top by the cover 3 to the container 4 comprises a discharge pipe connection 7, the open end of which, arranged within the container 4, constitutes the lower limit of the gas collection space A. The part of the connection which extends out of the container 4 discharges into an overflow vessel 8 in which the level of the electrolyte is indicated by a dashed line. The overflow vessel 8 is vented, but it is provided with a hydrophobic closure (not separately shown in the drawing) to protect against the emergence of electrolyte.

To the overflow vessel 8 there is connected a return pipe 9 which discharges into the lower region B of the container. In addition, a flexible siphon hose 10 is connected to the return pipe and terminates in a closure 11 which can be opened manually.

Finally, the container 4 has a current terminal 18 developed as a contact lug which, as shown in FIG. 1, is arranged at the height of the cover but which, in view of the fact that the container is made of metal and in view of the parallel connection of the two gas-diffusion electrodes by the metal housing, can be arranged at any desired point of the container.

In the vicinity of the cover 3 and of the gas-collection space A the anode 1 has a corrosion-protective coating 2 adjoining thereon which is a plastic netting 12 which can also be developed as a separator to separate the electrode 1 from the electrodes 5. In the embodiment shown a polypropylene sieve netting is provided for this purpose.

The cell described is filled in an unactivated state partly with electrolyte liquid, for instance in such a manner that the lower region B of the container is filled up to a level of liquid below the electrodes at the height of the arrow 41 in FIG. 2 of the drawing. In addition, electrolyte is present up to the same height in the pipe system and, in particular, therefore in the siphon hose 10, which constitutes an electrolyte reservoir. The activation of the cell is effected by lifting the flexible siphon hose 10 above the overflow vessel 8 so that it discharges into the container 4 until the height of filling indicated in dashed line in the overflow vessel has been reached. For this activation the closure 11 which is formed as a vent and electrolyte outlet flap must be opened.

The siphon hose 10 is left in its raised position and the cell can carry out the desired electrochemical conversions, the hydrogen which is formed being utilized to build up a cushion of hydrogen in the gas-collection space A. The pressure thereby produced in the system is utilized to transport electrolyte liquid through the discharge pipe connection 7 and the overflow vessel 8 through the return pipe 9 out of the upper region of the container back into the lower region B of the container. In order to turn off the cell it is merely necessary to bring the siphon hose 10 into its bottom position shown in FIG. 1 of the drawing, as a result of which the cell is emptied into the siphon hose and thereby deactivated.

With a cell of the type described which has an electrode surface of 100 square centimeters, the following data were obtained in air operation with an aluminum anode and 70 cubic centimeter electrolyte volume:

I=20A
i=0.20A×cm$^{-2}$
T=50° C.

The initial terminal voltage was 1.05 V.

We claim:

1. In a galvanic element, particularly a metal-air cell, having a consumable metal electrode of flat shape which extends into a container adapted to contain electrolyte liquid, and a gas-diffusion electrode freely flushable by gas and arranged at a distance from a working surface of said metal electrode, the improvement wherein said container being hermetically sealed with respect to gas produced during operation of the galvanic element by electrochemical conversion including means for collecting in said container the gas produced during operation of the galvanic element by electrochemical conversion, said means further for retaining said collecting gas in said closed container without venting said gas, said means further for building-up gas pressure of the related collecting gas in said container, and said means by the built-up gas pressure for operatively recirculating the electrolyte liquid through said container, said means defining a hermetic gas collection space for the collecting, retaining and the building-up of the gas pressure of the retained collecting gas produced by the electrochemical conversion, said collection space is formed in the upper part of said container, and the cell further comprises a pipe system which extends outside of said container, is connected communicatingly with said upper part of said container and a lower part of said container and is operatively acted on as a function of the gas pressure for the transporting of the electrolyte liquid from the upper region of the container into the lower region of the container, a cover hermetically closed the container in insulated manner and holds the metal electrode, said pipe system further includes, a discharge pipe connection projecting into the container through said cover and extending inside the container by an interior length of said discharge pipe connection, the latter being formed with an opening communicating with the upper part of the container, said interior length of said discharge pipe connection to said opening limiting said gas collection space, said opening defining a lower limit of said gas collection space, an overflow vessel leading to said discharge pipe connection, a return pipe leading from said overflow vessel into the lower part of the container, said pipe system includes a flexible siphon hose for the electrolyte liquid, a venting and electrolyte outlet closure means at one end of the siphon hose for being opened and closed, respectively, and said siphon hose being connected at its other end to said return pipe.

2. The metal-air cell according to claim 1, wherein said overflow vessel is outside of said container.

3. The metal-air cell according to claim 1, wherein said overflow vessel is integrated with said container.

4. The metal-air cell according to claim 1, further comprising a hydrophobic barrier closure means for venting said overflow vessel.

5. The metal-air cell according to claim 1, wherein said flexible siphon hose constitutes an electrolyte reservoir adapted for filling said container via said pipe system when said siphon hose is raised and for deactivating the galvanic element by lowering the siphon hose so that the electrolyte drains out of the container through said siphon hose.

6. The metal-air cell according to claim 1, wherein said container is made of an electrolyte-resistant metal and is provided with a current contact thereon, and a second current contact is formed as a lug on the metal electrode.

7. The metal-air cell according to claim 6, wherein said electrolyte-resistant metal is a metal selected from the group consisting of nickel and alloy steel for alkaline electrolytes.

8. The metal-air cell according to claim 1, wherein a current contact lug is formed on said metal electrode, said metal electrode is rectangular and has a corrosion-protecting coating at a transition to the lug.

9. The metal-air cell according to claim 1, wherein said container has flat sides and is formed with window-like cutouts in said flat sides each thereof opposite said working surface of the metal electrode, said gas-diffusion electrode with a hydrophobic barrier layer is inserted into each of said cutouts.

10. The metal-air cell according to claim 9, wherein the gas-diffusion electrodes are connected to the container by a conductive metal bonding.

11. The metal-air cell according to claim 10, wherein said plastic netting is a polypropylene sieve netting.

12. The metal-air cell according to claim 1, wherein the metal electrode is surrounded by a plastic netting at least in the region of said working surface.

* * * * *